United States Patent Office 2,852,349
Patented Sept. 16, 1958

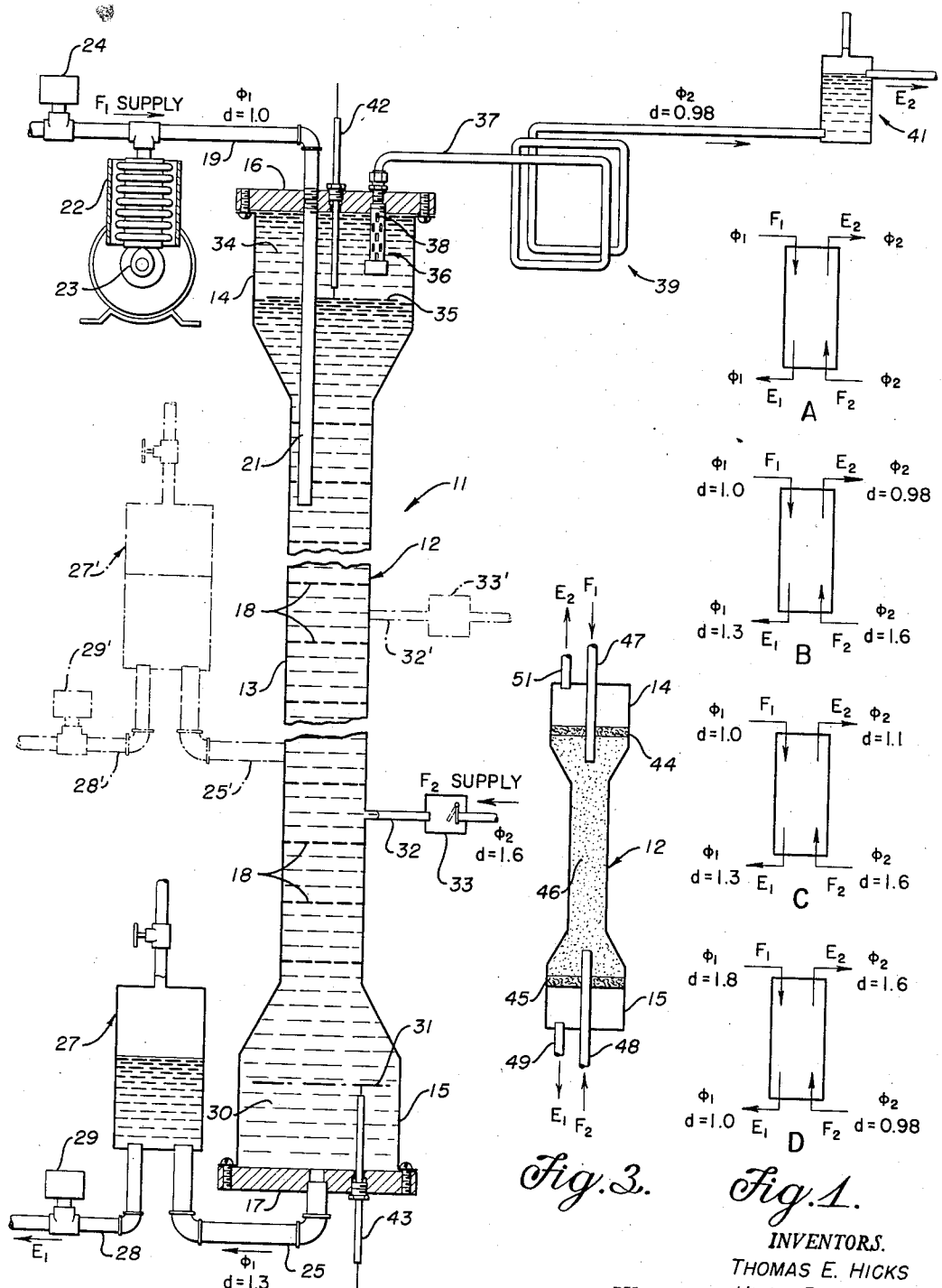

2,852,349

APPARATUS FOR LIQUID PHASE EXTRACTION

Thomas E. Hicks, Los Angeles, Calif., Hugh R. Lehman, Los Alamos, N. Mex., and Barney Rubin, Livermore, Calif., assignors to the United States of America as represented by the United States Atomic Energy Commission Application July 8, 1954, Serial No. 443,982

12 Claims. (Cl. 23—270.5)

The present invention relates generally to the contacting of immiscible liquid phases. More particularly, the invention relates to liquid-liquid extraction columns employing systems in which the liquid phases undergo a reversal or inversion in the order of densities during transit through the column and columns especially adapted for operation with such inverted densities.

Liquid-liquid contact of immiscible liquids is a basis feature of many processes, particularly of extraction processes. A great many devices such as extraction columns, mixer-settler units and others have been employed to increase the efficiency of contact between the liquid phases employed therein. One especially efficient system is that disclosed in the patent to W. J. D. van Dijck, No. 2,011,186 which was issued on August 13, 1935.

Generally, these devices and systems utilize countercurrent flow of two immiscible liquids of different densities with various agitation or dispersal means to improve or insure intimate contact of the two liquid phases, and thereby promote rapid transfer of desired materials across the phase boundaries. Van Dijck, noted above, utilized a column in which low density fluid is introduced at the lower end an heavy liquid is introduced at the upper end to flow countercurrently therein which liquids were caused to surge alternately through a perforated plate and thereby obtain intimate contact. These conventional methods are all similar in that the heavy phase is fed at a higher level than the lighter phase and the range of densities of the respective phases do not overlap. In these conventional processes inadvertent overlapping renders the processes inoperative and is therefore regarded as undesirable or even catastropic.

We have now discovered advantageous methods of operating extraction columns, particularly pulsed or surged columns wherein the denser phase may be fed at a lower level than the less dense phase. The methods depend essentially upon the establishment and maintenance of favorable density gradients throughout the column, whereby the phase which progresses upwardly at any one point in the column is at least slightly less dense than the phase passing downwardly exactly at that point. However, insofar as the system extractant and extracted phases as a whole are concerned, the heavier phase is fed at a lower level than is the lighter. The methods are especially useful since large amounts of materials or dense materials can be transferred between the phases so as to reverse the original density relations, e. g., from the denser to the lighter phase to the extent that the effluent density of the latter exceeds that of the former (density inversions). Normally, such inversion would cause extraction devices to become inoperative since the feed solutions would remain in the sections of extraction equipment to which they are introduced. Herein, the result is a great increase of product concentration in the extractant and much more efficient operation. Especially adapted pulse or surge column apparatus for conducting the process is also provided.

Accordingly, it is an object of the invention to provide efficient liquid-liquid extraction processes.

Another object of the invention is to provide improved methods of contacting immiscible liquids.

Still another object of the invention is to provide novel methods of conducting extractions between immiscible phases.

A further object of the invention is to provide immiscible liquid extraction methods wherein the higher density phase may be introduced into an extraction column at a lower level than the lower density phase.

A still further object of the invention is to provide immiscible liquid extraction methods wherein favorable density gradients are established in an extraction column whereby the denser liquid may be introduced at a lower level than the less dense liquid with the maintenance of stable operating conditions therein.

It is still another object of our invention to provide extraction columns especially adapted for operation with inverted density relations of the immiscible liquid phases.

Another object of the invention is to provide an extraction apparatus wherein the immiscible fluid phases are surged to increase contact thereof and which apparatus is especially adapted for introduction of the fluid phases in inverted density relation.

Other objects and advantages will become apparent from consideration of the following description and accompanying drawing, of which:

Figure 1 (A, B, C, and D) are block diagrams illustrating normal density and inverted density operation in accordance with the invention;

Figure 2 is a diagrammatic representation of an inverted density pulsed extraction column in accordance with the invention;

Figure 3 is a vertical cross-sectional view of a packed column intended for use in inverted density extraction operation.

In order to facilitate comprehension of the description, the term "inverted density" as opposed to "normal density" operation will now be described with the aid of the diagrams of Fig. 1. The present invention concerns the contact of two mutually immiscible phases, $\phi_1$ and $\phi_2$, respectively, in an extractor for the purpose of effecting the transfer including selective transfer of a component of one of said phases to the other, as in washing, extraction, purification, etc.

"Normal density" operation is considered to be the situation indicated in diagram A of Fig. 1, wherein the extractor is represented in a vertical rectangular block form. $\phi_1$, the denser phase, is fed into the upper portion of the column and emerges from the lower portion while $\phi_2$, the lower density phase, is fed into the lower portion of the column, contacts $\phi_1$, countercurrently, and emerges from the upper portion thereof. As employed in such Fig. 1, the symbol F with an appropriate suffix represents the point of introduction or "feed" and symbol E, the effluent stream of a particular phase ($\phi_1$ or $\phi_2$). Depending on the net effect of materials transferred from and into the respective phases during transit of the column, the density of the individual phases may become nearly equal or may become even more different. In any event, the minimum density of $\phi_1$ does not ever decrease to below the maximum density of $\phi_2$, whereby the range of densities of $\phi_1$ and $\phi_2$, respectively, do not coincide nor do the density relations invert in any manner. Conventionally, this "normal density" situation is necessary to cause the phases to traverse the column in a normal fashion.

In the "inverted density" operations contemplated by this invention, substantial portions of the density ranges of $\phi_1$ and $\phi_2$ always overlap and the densities of $F_1$ and $F_2$ may invert during transit of the extractor, whereby the densities of $E_1$ and $E_2$ bear a reciprocal or inverted order relation to the original densities, $d$ of $F_1$ and $F_2$. Examples of such "inverted density" situations are illustrated in diagrams B, C, and D of Fig. 1.

In the example of diagram B, the density range, of $\phi_2$, i. e., $dF_2-dE_2$, totally contains the density range of $\phi_1$, i. e., $dF_1-dE_1$, wherefore $dF_2>dE_1>dF_1>dE_2$. Numerical density values indicated thereon are intended to illustrate essentially relative rather than specific values.

In the example illustrated in diagram C, of Fig. 1, the density ranges of $\phi_1$ and $\phi_2$ overlap in such a manner that $dF_2>dE_1>dE_2>dF_1$. Again the numerical values are intended to illustrate relative rather than absolute values.

In the example illustrated in diagram D, of Fig. 1, the density ranges of $\phi_1$ and $\phi_2$ overlap in such a manner that $dF_1>dE_2>dE_1>dF_2$, with the numerical values again illustrating relative and not absolute numerical values. It will be noted, in diagrams B, C, and D that the points of introduction and effluence of $F_1$ and $E_1$ are similar to that indicated in diagram A; however, the relative positions of $F_2$ and $E_2$ in diagrams B, C, and D are interchanged or "inverted" with reference to the positions occupied in diagram A.

Surge or pulse column systems of especially adapted forms may be provided in accordance with the invention to carry out the "inverted" density liquid-liquid contact required in operating the diagrammatically illustrated processes. Generally speaking, such a column system will comprise a vertically-disposed, closed elongated tubular column provided with internally disposed dispersal means to assure reduction of at least one of the phases into droplets or the surging of the liquid, pulsing means for causing the liquid to surge alternately upwardly and downwardly within the column, means for introducing the respective phases at the appropriate points of the column, whereby the required density gradients may be produced and maintained, and means for maintaining certain interface levels at required positions.

More particularly, with reference to Fig. 2 of the drawing, such column system, indicated generally at 11, may comprise a vertically disposed tubular column 12, usually cylindrical and formed of glass or noncorrodible metal which column 12 includes an elongated central portion 13 and upper 14 and lower 15 bell or expanded sections. The upper open end of bell section 14 and lower open end of bell section 15 are closed as by means of flanged and gasketed cover plates 16 and 17, respectively, whereby the cavity of the column 12 is completely enclosed.

Within the elongated central portion 13 and, appropriately, also within adjacent portions of bells 14 and 15, phase dispersal means may be disposed. Such phase dispersal means will generally comprise surfaces or forms which provide generation of shear and turbulent forces in liquids surging within the column 12, whereby at least one of said phases is reduced to droplet form while the other may remain essentially continuous. Spaced parallel perforated plates 18 disposed horizontally and attached peripherally within the column are quite satisfactory; however, perforated or porous plates disposed otherwise or other packed columns, described more fully hereinafter, are also satisfactory.

Pulse generation and feed of the less dense phase 1, i. e., $\phi_1$, may be accomplished simultaneously by means of line 19 leading from a gravity or otherwise positively fed supply (not shown) through cover plate 16 and extending downwardly as a dip tube portion 21 within column 12 to within the area occupied by the aforesaid dispersal means 15 noted. Pulsing means comprising a Sylphon bellows 22 may be connected with line 19 and adapted to be compressed longitudinally by a motor-driven cam 23 causing liquid in line 19 and, accordingly, in column 12, to surge alternately in opposite longitudinal directions. Other diaphragm, piston pump or similar pulsing means may be used equivalently. A check valve 24 or other fluid impedance means may be provided between the $\phi_1$ supply and bellows 22 to exclude the surge from the $\phi_1$ supply.

Effluent $\phi_1$ is discharged through a line 25 which connects with the lower portion of column 12, e. g., through cover plate 17 into a jackleg or similarly elastic expansion device 27 into which the surged solution, i. e., effluent $\phi_1$, is cyclically introduced and removed by action of the pulsing means. Conveniently, a portion of $\phi_1$ can be controllably discharged to the exterior from device 27 through a line 28 having either a manual or controlled valve 29 located therein. Preferably, such valve 29 is a device, e. g., a solenoid valve, the operation of which can be automatically actuated by the position of a phase interface located in a bell portion, as described hereinafter. In normal operation $\phi_1$, forms a layer 30, having an upper interface 31 in lower bell portion 15. $\phi_2$, the denser phase, is introduced by means of a line 32, through a check valve 33, or similar device which impedes reverse fluid flow, into a lower portion of the central portion 13 of column 12 above at least one of the plates 18. Such $\phi_2$ travels upwardly, to the upper bell portion 14, wherein it separates, as described more fully hereinafter, forming a layer 34 with the lower interface 35. Effluent $\phi_2$ is withdrawn from layer 34 through an interface protector 36 by means of a line 37 which enters upper cover plate 16. Such interface protector 36 may be formed as a closed end tubular section forming the terminus of line 37 and having perforations 38 formed in the side walls whereby only horizontal openings communicate flow into said line 37. The uppermost of said perforations 38 should be flush with the lower side of cover plate 16 thereby permitting all air to be discharged from the column. Line 37 is provided with fluid flow impedance means such as a coil 39 of considerable line length which serves to conserve the fluid pulse within the column. The line 37 then passes through a vented reservoir 41 to a discharge for effluent $\phi_2$. Such vented reservoir 41 facilitates elimination of air from the system.

To provide proper interface positioning control in automatic operation, when electrically conductive and nonconductive phase are processed, an insulated electrical probe 42, preferably of adjustable length, passes through cover plate 16 and extends into upper bell portion 14 whereby the exposed lower tip of the central conductor thereof is in the upper interface 35 region. An electrical circuit completed through the conductive phase and through probe 42 may serve to actuate control valve means 29, through magnetic or electronic amplifiers of simple conventional design (not shown). Similarly, other interface level control means actuated by photoelectric, fluorimetric, and similar level sensing devices can be used for the purpose of regulating the inflow or efflux of any of the fluid streams and consequently regulate the interface level. A similar probe 43 extending into lower bell portion 15 may be employed to control the position of lower interface 31, if desired or necessary, either by regulating discharge from valve 29, rate of supply from $\phi_1$ supply, or a combination of these operations.

Modification of the column system as indicated in Fig. 3 of the drawing, provides a packed column which may be operated in the inverted density manner. More particularly, the general form of vertical column 12 is retained; however, pervious horizontal support partitioning members 44 and 45 are provided in upper and lower bell portions 14 and 15, respectively, and spaced from the cover plates (not shown). Perforated or sintered glass or metal plates serve well as such pervious members. Thereby, packing 46 of a large variety of forms may be disposed between pervious members 44 and 45. Such packing 46 may take the form of granules, annular rings, balls, and other geometric forms which provide a multitude of tortuous paths through such tube 12.

Feed tube 47, for $\phi_1$, should project somewhat into and, therefore, be buried in the upper portion of the packing. Preferably, this feed tube 47, which corresponds to diptube 21, noted above, is disposed axially in the tube 12, to promote more uniform distribution of the lighter phase $\phi_1$. Likewise, feed tube 48, for the denser phase $\phi_2$, projects upwardly from the lower end of tube 12 and within the packing 46. Effluent $\phi_1$ may then be withdrawn through line 49 which is terminated just within the lower cover plate (not shown) and effluent $\phi_2$ may be withdrawn through line 51 which terminates just within the upper cover plate (not shown) just as in the first described system. Likewise, the pulsing means and other accessories may be similar to those described above; however, other means of supplying energy necessary to accomplish dispersion of the discontinuous phase and establish the necessary density gradients may be employed. In some cases, with both of the columns described above, it is merely necessary to agitate the phases in the region of the feed points, particularly of the denser phase as by appropriately efficient stirring, jetting or spraying, or similar methods.

In operating pulsed perforated plate columns described hereinbefore, with top-pulsing and inverted density feed, certain design requirements must be met in order to insure efficient and trouble-free operation. A primary requirement is that any line entering the top of the column and also some of the lower lines must provide a high impedance to the pulsed liquid for otherwise the pulse would be lost through such lines instead of traveling down the column. Also, the column must not have a gas space at the top (i. e., it must be completely liquid-filled) as the pulse would be largely expended in merely compressing the gas in this space rather than pulsing the liquid in the column proper. Because of the incompressibility of liquids the pulsed liquid must work against an elastic section located somewhere along the column or a low impedance line attached thereto. The location of the elastic section determines the extent of pulse travel in the column. Thus, if the elastic section is located for example at the midpoint of the column (see 25', 27', 28' and 29') the pulse will travel from the pulse pump down to this midpoint and be reflected at this location while the liquid in the remainder of the column beyond this point will not be pulsed. For inverted density feed, the feed lines must be "buried" in the column in order to prevent the phases from "leaking out" of the column before the favorable differential density gradient is established. Means should also be provided for the automatic control of the phase interface levels within the column; and to insure stable, jitter-free, operation of this control, the interface should be protected and located in an enlarged section of the column (where the increased cross-sectional area greatly diminishes the vertical travel of the interface during each pulse).

Operation of the system will be described with reference to extraction of dense metal values from an aqueous phase, by an organic solvent-extractant phase with the density relations indicated in diagram B of Fig. 1, and also indicated in Fig. 2 of the drawing. To begin operation, column 12 is filled with the lower density, $d=$e. g., 1.00, extractant, $\phi_1$ through feed line 19 with the pulsing means operating so as to force liquid through plates 18 and evict air from the column. Ordinarily, the porosity of the plates 18 and the feed pressure of $\phi_1$ should be such that $\phi_1$ will not flow readily through such plates without the assistance of the pulsing means. Initially, the effect of the pulsing will be diminished due to compressibility of the air present in the column; however, the pulsing increases to the necessary level as air is evicted through line 37. When the latter state is achieved, introduction of the relatively denser, $d=$e. g., 1.6, $\phi_2$, is begun. As the dense phase encounters the less dense phase, at least one of the phases is violently dispersed into the other by the forcible encounter with adjacent plates 18 caused by the surging force of $\phi_1$. Due to the greater density of $\phi_2$ the normal tendency is to sink; however, extraction of heavy constituents which begins immediately on introduction of $\phi_2$ brings about an exchange of density relations, locally, whereby $\phi_1$ becomes denser than $\phi_2$ and therefore $\phi_1$ continues its normal course toward the lower portion of the column while $\phi_2$ rises. On continuing operation a steady state is achieved wherein, ideally, $\phi_1$ has a density gradient increasing, e. g., from 1.00 to 1.3, from top to bottom of the column while $\phi_2$ has a density gradient decreasing from the point of introduction to the top of the column. On general consideration, it will be seen that $\phi_1$ must become slightly denser than $\phi_2$ in order to maintain proper functioning of the system. A similar state may be induced in cases where the final density of the upwardly flowing phase is considerably less than the introduced originally less dense phase. By promoting a rapid exchange of materials at the point of introduction of this latter phase, the collection of a light layer of effluent, originally dense phase, in the upper bell portion 14 of the column, is assured. Effluent $\phi_2$ can then be withdrawn from line 37 and effluent $\phi_1$ from line 28.

The remarkable effectiveness of the system is explainable on consideration of certain factors. Since the density relations of the two phases can differ only slightly, quite lengthy contact times with large contact surfaces can be obtained in the central and lower regions of the column. Operation is regulated whereby interface 31 over layer 30, of $\phi_1$, is formed in the lower bell portion 15. Above this interface, there will be a dispersion of $\phi_2$ and $\phi_1$, which dispersion will also occupy the aforesaid gradient region and somewhat above the lower end of diptube 21 to the interface 35 whereat said droplets coalesce forming the layer 34. In this manner rapid and complete transfer of the extracted materials is promoted, particularly since relatively pure $\phi_1$ contacts substantially depleted $\phi_2$ in the upper portion of the column. Similar techniques and results are obtained with the other inverted density phase relations shown in the diagrams of Fig. 1.

It may be noted that there will exist in the column a zone of intermixture in which dispersed portions of the phases will have varying gradations of densities and, therefore, constituency. However, the portions of $\phi_2$ as they become less dense more and more forcibly tend to rise through the indistinct boundaries of this zone while the converse is true of the dispersed portions of the originally less dense phase, i. e., $\phi_1$. Accordingly, above and below the indistinct boundaries gradient densities are established; however, over a fairly long region the densities of the phases at the same level may be only slightly different and therefore the rate of countercurrent travel is slow and long contact can be had.

Proper operation is dependent on maintenance of the respective interface levels which operation is tremendously facilitated by use of at least an upper interface level control means such as the probe 42 which can automatically actuate valve 29 so as to regulate the rate of withdrawal of $\phi_1$. Adjustment of the relative flow rates of $\phi_1$ and $\phi_2$ together with regulation of pulse rate and magnitude will usually regulate the phase behavior along the gradient sections.

With correctly functioning columns, the top interface 35 automatically finds its location without further attention. However, during the filling period, prior to complete filling of pulse conserving resistance coil 39, the line 37 is strongly pulsed. The interface protector 36 directs the returning pulse towards the column walls via horizontal openings 38 and thus maintains an undisturbed interface 35 for the automatic control system during this period. The opening 38 flush with top plate 16 is required to remove all air from the column. With this arrangement, it is apparent that any air introduced accidently during the operation of the column will cause no difficulty as it will be immediately removed from the column via line 37 to reservoir 41 which is vented to the atmosphere.

In summary, all that is required to start a column of the type shown in Fig. 2 is to almost fill the column with the $\phi_1$ feed and then start the $\phi_2$ feed. These operations are easily accomplished remotely. In the event that $\phi_2$ is continuous, it is more convenient to employ probe 43 to control the lower interface 31 level. In general, for probe operation the continuous phase will be an electrically conductive, e. g., an aqueous phase, in order that the electrical circuit can be completed therethrough.

It must be noted that line 32 is not intended as a "centerfeed" although the position thereof might suggest this possibility. The position of such line 32 is dictated by the consideration that if no hindrance existed, as offered, by lower plates 18, $\phi_2$ would descend as in the normal fashion and be lost through line 25. Centerfeed can be used as indicated by the position of 32' (and 33') of Fig. 2, either for feeding additional $\phi_2$ or material for other purposes. Likewise, the elastic expansion device 27 may be located higher on the column as indicated by 25' and 27' of Fig. 2; however, if only a single elastic expansion device is employed, it must be located below 32 or 32', whichever is lowest. Several such devices can be disposed along the column to obtain a surge gradient and thereby regulate attendant agitation and dispersion of the phases as well as stabilize the lower interface 31.

No particular limitation of the device or process is intended since extractions between immiscible phases may be accomplished under the indicated phase density relations. A multitude of existing processes can be adapted to operate under the "inversion of density" principle disclosed herein in order to yield more efficient operation and higher product concentrations or impurity removal. This device and process should find especial utility in extraction processes employed to purify and recover metal values, particularly dense metals wherein the metal value is extracted between aqueous and organic solvent phases. For example, in practice the extraction of uranium from nitric acid solutions of uranyl nitrate has been completely satisfactory. The extraction of metals from aqueous solutions by extractant phases including organic solvent-extractant phases such as ketones, ethers, chelating agents, mixtures of an extractant and an organic solvent or diluent and a great number of similar processes may be operated in the disclosed manner. Low density components could equivalently be extracted between phases in the inverted density manner of operation.

While there has been described in the foregoing what may be considered to be preferred embodiments of the invention, modification may be made therein, and it is intended to cover all such as fall within the scope of the appended claims.

What is claimed is:

1. A pulsed extraction device adapted for inverted density operation comprising a closed tubular column having upper and lower enlarged terminal portions and an elongated constricted central section, pulsing means coupled to an upper portion of said column to effect surging of a fluid in alternating directions in at least said constricted section of the column and including an elastic member coupled with the lower portion of the column into which the surge volume of fluid may enter, unidirectional flow means for introducing a first dense phase into said column at a location above said elastic member, unidirectional flow means for introducing a second less dense phase into said column above the input of said first phase and into contact therewith, fluid dispersal packing means disposed in the constricted section of said column supported in spaced relation to the column end faces providing free volume space therebetween in which volume phase separation and interface establishment may occur, said packing means being at least partially disposed in the zone of initial contact between said phases and extending above and below the input locations of said phases for dispersing one of said phases in the other and effecting a rapid transfer of material therebetween in a zone of intermixture producing an inversion of relative densities in said zone, a discharge for said first phase offering impedance to the surge and located above the input of said phase, a discharge for said second phase offering impedance to the surge and disposed below the input of said phase, and an interface level control including means for sensing the level of said interface and means actuated thereby for controlling the rate of flow of input or discharged phases, whereby the said phases countercurrently contact each other while establishing density gradients above and below the zone of intermixture which cause the originally denser phase to move upwardly and the originally less dense phase to move downwardly.

2. The device as described in claim 1 but wherein the first phase discharge is arranged to discharge such phase from the upper enlarged portion and said second phase discharge is arranged to discharge such phase from the lower enlarged portion of the column.

3. The device as described in claim 1 but wherein said packing means comprises a series of perforated plates attached peripherally to the interior of said column and with at least one plate disposed above and below the input of said phases, respectively.

4. The device as described in claim 1 but wherein said packing means comprise geometric forms capable of generating turbulence and shear forces effective in dispersing the liquids surging in contact therewith.

5. The device as described in claim 4 but wherein said packing means comprise particulate geometric forms which are retained in the described location by horizontally disposed pervious plate support members attached to the interior of said column.

6. The device as described in claim 4 but wherein said packing means comprise particulate geometric forms retained in the described location by horizontally disposed pervious upper and lower plate support members attached to the interior of said column and the means of introducing said phases terminate within the body of said packing while the means for discharge of said first and second phases are coupled to the column so as to discharge the phases from above and below the upper and lower pervious support members, respectively.

7. A pulsed extraction device adapted for inverted density operation comprising a closed tubular column having enlarged upper and lower enlarged terminal portions and an elongated constricted central portion, pulsing means including a variable volume chamber coupled by an inlet to an upper portion of said column, motor means arranged to periodically vary the volume of said chamber, and a second variable or elastic chamber coupled to said column by an inlet disposed below the inlet to said variable chamber, whereby fluid is alternately impelled into and expelled from said chambers so as to surge in alternate directions along the constricted portion of the column, unidirectional flow means for introducing a dense first phase above the inlet to said second elastic volume, unidirectional flow means for introducing a less dense second phase into the column above the input of said first phase and into contact therewith, fluid dispersal means supported in spaced relation to the column end faces providing free volume space therebetween in which volume phase separation and interface establishment may occur and being at least partially disposed in the zone of initial contact between said phases to effect efficient contact and rapid transfer of a material between said phases thereby producing an inversion of relative densities in an intermixture zone, a surge impeding line for discharging the second phase from a location above the input of the first phase, a surge impeding line for discharging the first phase below the input of the second phase, and an interface level control including means for sensing the level of said interface and means actuated thereby for controlling rate of flow of input or discharged phases.

8. The device as described in claim 7 but wherein said interface sensing means comprises an insulated probe including a bare tip portion disposable at the desired interface level, electrical circuitry completed through a conductive phase in contact with said probe and discontinued through displacement of the conductive phase by a nonconductive phase, means for amplifying the signal passing through such circuit, and flow restricting means actuated by said amplifier for regulating rate of flow of one of said phases.

9. The device as described in claim 8 but wherein the inlet of the discharge means for the second phase is provided with interface protector means disposed within the upper free volume space.

10. The device as described in claim 8 but wherein the inlet of the discharge means for the second phase comprises a radially perforated tubular portion disposed vertically and with the uppermost of said perforations adjacent the upper end face of said column, whereby air trapped in the column may escape through said discharge.

11. A pulsed extraction device adapted for inverted density operation comprising a closed tubular column having enlarged upper and lower terminal portions and an elongated constricted central portion, pulsing means including a variable volume chamber coupled by an inlet to an upper portion of said column, motor means arranged to periodically vary the volume of said chamber, and an elastic chamber coupled by an inlet to said chamber disposed below the inlet to said variable chamber, whereby fluid is alternately impelled into and expelled from said chambers so as to surge in alternate directions along the constricted portion of the column, unidirectional flow means for introducing a dense first phase above the inlet to said elastic chamber, unidirectional flow means for introducing a less dense second phase into the column above the inlet of said first phase and into contact therewith, fluid dispersal means disposed in the region of contact of said phases to effect efficient contact and rapid transfer of a material between said phases thereby producing an inversion of relative densities in an intermixture zone, a surge impeding line for discharging the second phase from a location above the inlet of the first phase, and a surge impeding line for discharging the first phase from a region situated below the inlet of the second phase.

12. A pulsed extraction device adapted for inverted density operation comprising a closed tubular column having enlarged upper and lower terminal portions and an elongated constricted central portion, pulsing means including a variable volume chamber coupled by an inlet to an upper portion of said column, motor means arranged to periodically vary the volume of said chamber, an elastic chamber coupled by an inlet to said chamber disposed below the inlet to said variable chamber, whereby fluid is alternately impelled into and expelled from said chambers so as to surge in alternate directions along the constricted portion of the column, unidirectional flow means for introducing a dense first phase above the inlet to said elastic chamber, unidirectional flow means for introducing a less dense second phase into the column above the inlet of said first phase and into contact therewith, fluid dispersal packing means supported in spaced relation to the end faces of the column to provide upper and lower free volumes in the enlarged portions of said column and disposed in the region of contact of said phases to effect efficient contact and rapid transfer of a material between said phases thereby producing an inversion of relative densities in an intermixture zone, a surge impeding line for discharging the second phase from a location above the inlet of the first phase, and a surge impeding line for discharging the first phase from a region situated below the inlet of the second phase.

References Cited in the file of this patent

UNITED STATES PATENTS

| | | |
|---|---|---|
| 2,011,186 | Van Dijck | Aug. 13, 1935 |
| 2,121,324 | Manley | June 21, 1938 |
| 2,164,193 | McKittrick | June 27, 1939 |
| 2,364,892 | Elgin | Dec. 12, 1944 |
| 2,729,550 | Maycock et al. | Jan. 3, 1956 |
| 2,743,170 | Burger | Apr. 24, 1956 |